Jan. 12, 1954
W. C. LEWIS
2,665,485
MECHANIC HAND LEVEL
Filed Sept. 10, 1951
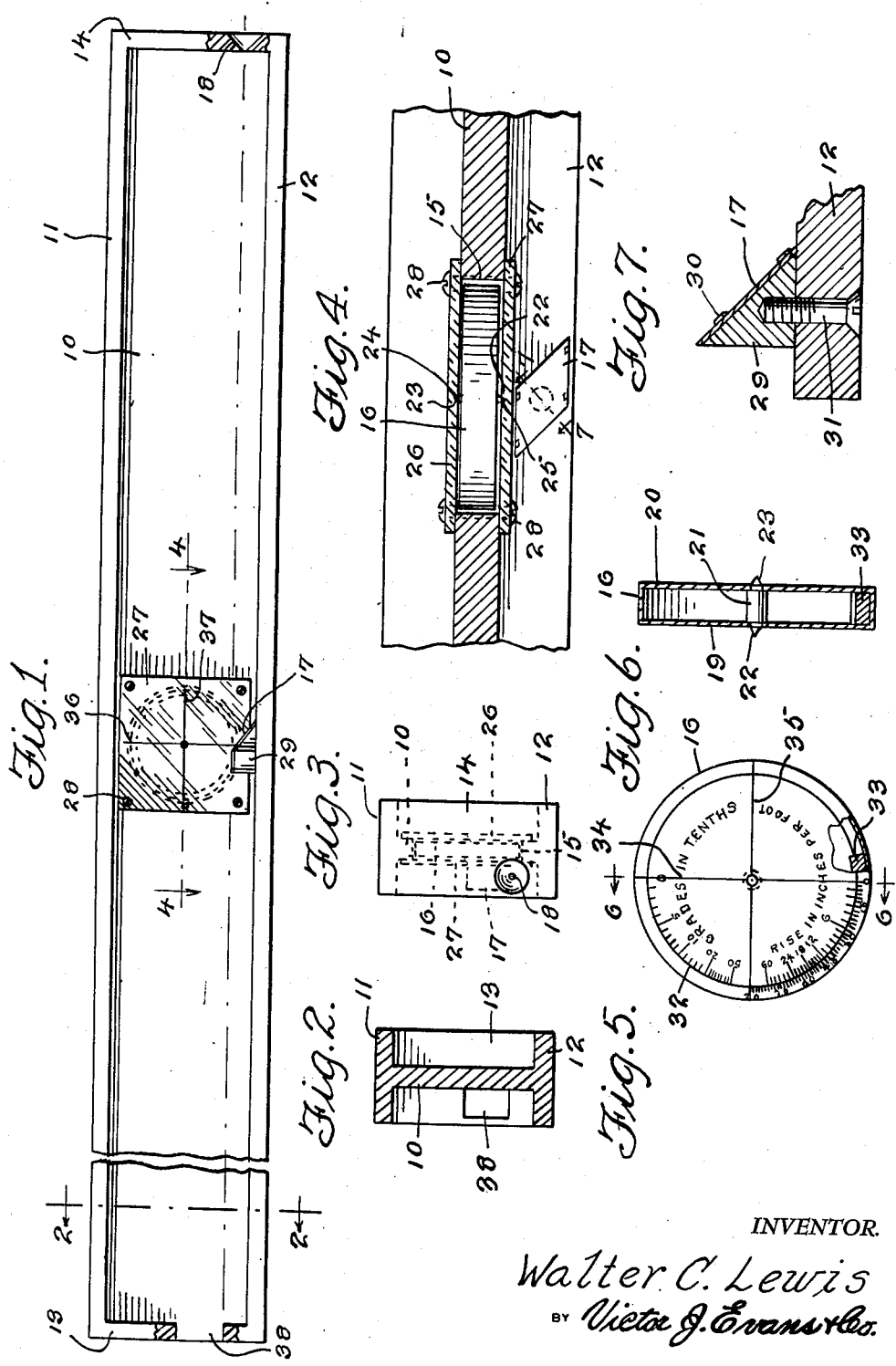
INVENTOR.
Walter C. Lewis
BY Victor J. Evans & Co.
ATTORNEYS Patented Jan. 12, 1954

2,665,485

UNITED STATES PATENT OFFICE 2,665,485

MECHANIC HAND LEVEL

Walter C. Lewis, Dallas, Tex.

Application September 10, 1951, Serial No. 245,847

3 Claims. (Cl. 33—70)

This invention relates to levels of the type generally referred to as spirit levels, and in particular the level of this invention includes a graduated drum journalled between transparent plates on the sides of a web of an elongated frame I-shaped in cross section and having a diagonally disposed mirror on one side of the frame and positioned whereby graduations on the drum are observed from a peep sight in an end of the frame.

The purpose of this invention is to provide a level for leveling up work on a work bench or machine tool wherein a mechanic can tell whether or not a part is level from the end of a level, thereby eliminating the necessity of leaving his position at the end of the level and moving around to one side thereof.

In the conventional type of spirit of mechanics level it is necessary to observe the position of a bubble or other level indicating means on the side of the level and because it is necessary for the mechanic to move away from the end of the level to take the reading it is difficult to accurately adjust the position of the parts on which the level is positioned. With this thought in mind this invention contemplates a level having a mirror positioned on one side thereof whereby the device functions as a periscope so that a reading showing the angle of work upon which the level is positioned can be taken from the end of the level.

The object of this invention is, therefore, to provide an attachment adapted to be incorporated in a level whereby the position of the level or device upon which the level is positioned may be determined from the end of the level.

Another object of the invention is to provide means for reading a level from one end thereof that may be incorporated in levels now in use.

A further object of the invention is to provide a level having a mirror mounted thereon for reading the level indicating means thereof from one end of the level which is of a simple and economical construction.

With these and other objects and advantages in view the invention embodies an elongated frame, I-shaped in cross section having a web with a drum having graduations on the surfaces positioned in the opening and having a shaft journalled in transparent plates positioned on the sides of the web and also having a diagonally positioned mirror with the angle thereof extended in two directions whereby the position of the drum may be reflected to a peep hole or opening in one end of the frame.

Other features and advantages of the invention will appear from the following description taken in connection with the drawings wherein:

Figure 1 is a side elevational view illustrating the improved level, with parts broken away and with parts at the ends shown in section.

Figure 2 is a cross section through the frame of the level taken on line 2—2 of Fig. 1.

Figure 3 is an end elevational view of the level showing the peep hole in the end thereof.

Figure 4 is a sectional plan on an enlarged scale taken on line 4—4 of Fig. 1 illustrating the drum mounting in the center of the level.

Figure 5 is a side elevational view of the drum which is positioned in the web of the frame of the level.

Figure 6 is a cross section through the drum taken on line 6—6 of Fig. 5.

Figure 7 is a detail on a further enlarged scale showing a section taken on line 7—7 of Fig. 4 illustrating the angular positioned mirror.

Referring now to the drawings wherein like reference characters denote corresponding parts the improved level of this invention includes an elongated frame having a web 10 with flanges 11 and 12 on the upper and lower edges, respectively, and flanges 13 and 14 on the ends, and the web 10 is provided with a cylindrical opening 15 in which a drum 16 is positioned and graduations on the drum are reflected by a mirror 17 through a peep hole or sight 18.

The drum 16, which is of cylindrical shape is provided with end plates 19 and 20 and a spindle 21 having tapering ends 22 and 23 is fixedly mounted in the end plates, as shown in Fig. 6.

The cylinder is positioned in the cylindrical opening 15 in the web 10 and the ends 22 and 23 of the spindle extend into similarly shaped recesses 24 and 25 in transparent plates 26 and 27 that are retained in position by screws 28 which are threaded into the web 10.

The mirror 17 is carried by a diagonally positioned block 29 with the mirror held in position by clips 30, extended from the block, and the block is secured on the lower flange 12 of the frame by a screw 31.

The side surfaces of the end plates 19 and 20 of the drum are provided with graduations 32, and a weight 33, in one side of the drum, retains the drum in a position wherein the vertically disposed index line 34, thereon, is vertical and the corresponding line 35 is horizontal.

The transparent plates 26 and 27 are also provided with index lines 36 and 37 and the flange 13 at one end of the frame is provided with an opening 38.

With the parts arranged in this manner the level is positioned on the bed of a machine, table, or a piece of work and with the eye of the operator positioned to look through the opening 18 adjusting screws may be operated to accurately position the bed or work. By this means the surface upon which the level is positioned is moved with the eye of the operator on the graduations.

It will be understood that modifications may be made in the design and arrangement of the parts without departing from the spirit of the invention.

What is claimed is:

1. A level comprising an elongated frame having a vertically positioned web with flanges on the sides and ends, with a cylindrical opening in the web and with aligned openings in the flanges on the ends of the web, a circular member having radially disposed graduations thereon journalled in the cylindrical opening of the web and a diagonally disposed mirror mounted on the flange on the lower side of the web and positioned to reflect graduations of the circular member through one of the openings in the flanges at the ends of the frame.

2. In a level, the combination which comprises an elongated frame having a continuous centrally positioned web with side and end flanges providing a member I-shaped in cross section, said centrally positioned web having a cylindrical opening therethrough and the flanges at the ends of the web having openings therein, transparent plates having aligned notches in the inner surfaces mounted on the sides of the web and positioned to cover the said cylindrical opening and with the notches in the inner surfaces positioned on the axis of said cylindrical opening, a drum shaped member having radially disposed graduations on the sides and a weight in one side positioned in the cylindrical opening of the web and between the said transparent plates, a spindle extended through said drum shaped member and having conical shaped ends, said conical shaped ends extended into the notches of the transparent plates for journalling the drum shaped member in the said cylindrical opening of the web, said transparent plate having vertical and horizontal index lines thereon, and a diagonally positioned mirror carried by the flange on the lower side of the web and positioned to reflect graduations of the drum like member through an opening in the flange at one end of the web.

3. In a level, the combination which comprises an elongated frame having a continuous centrally positioned web with side and end flanges providing a member I-shaped in cross section, said centrally positioned web having a cylindrical opening therethrough and the flanges at the ends of the web having openings therein, transparent plates having aligned notches in the inner surfaces mounted on the sides of the web and positioned to cover the said cylindrical opening and with the notches in the inner surfaces positioned on the axis of said cylindrical opening, a drum shaped member having radially disposed graduations on the sides and a weight in one side positioned in the cylindrical opening of the web and between the said transparent plates, a spindle extended through said drum shaped member and having conical shaped ends, said conical shaped ends extended into the notches of the transparent plates for journalling the drum shaped member in the said cylindrical opening of the web, said transparent plates having vertical and horizontal index lines thereon, said drum shaped member also having vertical and horizontally disposed index lines on the sides and said vertical index lines positioned to correspond with the center of the weight in one side of said drum shaped member, and a diagonally positioned mirror carried by the flange on the lower side of the web and positioned to reflect graduations of the drum-shaped member through an opening in the flange at one end of the web.

WALTER C. LEWIS.

References Cited in the file of this patent

UNITED STATES PATENTS

| Number | Name | Date |
|---|---|---|
| 892,468 | Unger | July 7, 1908 |
| 901,888 | Grim | Oct. 20, 1908 |
| 1,209,395 | Church | Dec. 19, 1916 |
| 1,424,229 | Wyckoff | Aug. 1, 1922 |
| 1,433,513 | Luce | Oct. 24, 1922 |
| 1,732,335 | Iverson | Oct. 22, 1929 |
| 2,372,091 | Land | Mar. 20, 1945 |
| 2,580,601 | Rouse | Jan. 1, 1952 |